Feb. 17, 1970  M. J. TEDRAKE  3,495,476
VARIABLE-RATIO LEVER MECHANISMS
Filed July 3, 1968  5 Sheets-Sheet 1

Inventor
Michael John Tedrake
By D. D. McGraw
Attorney

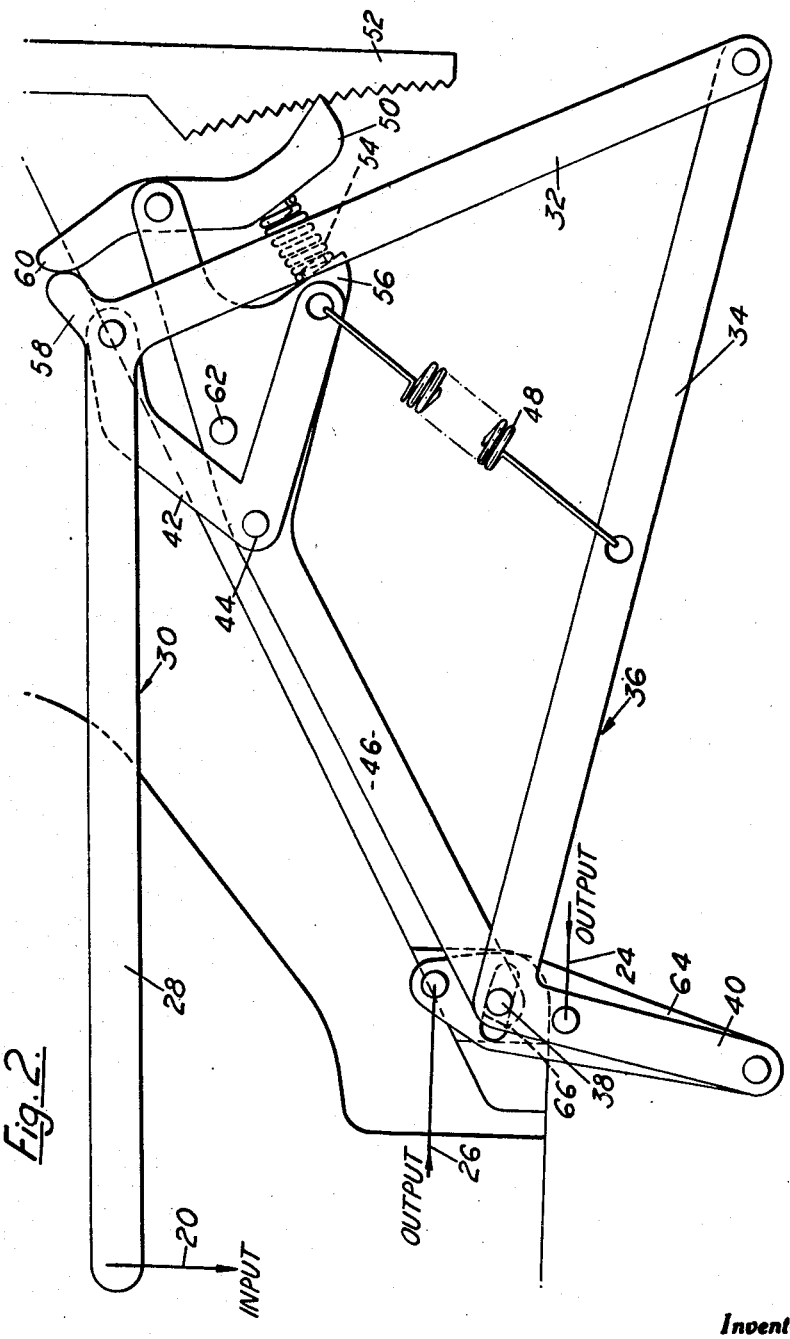

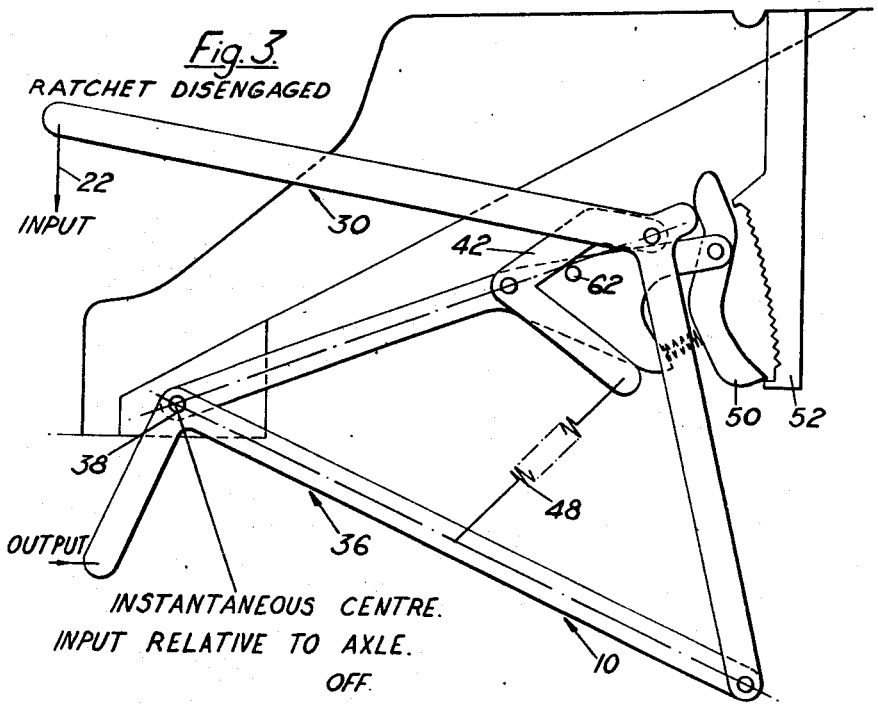
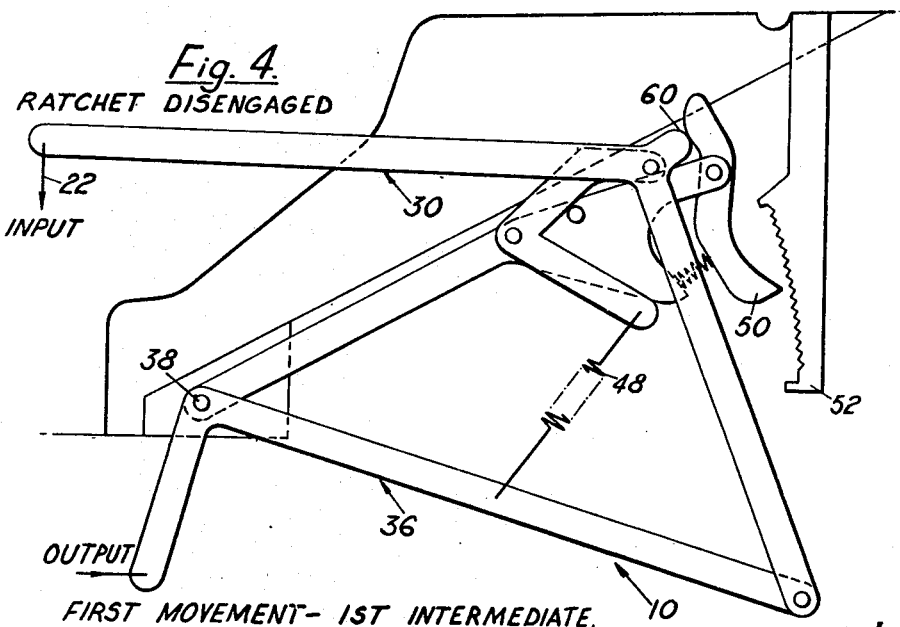

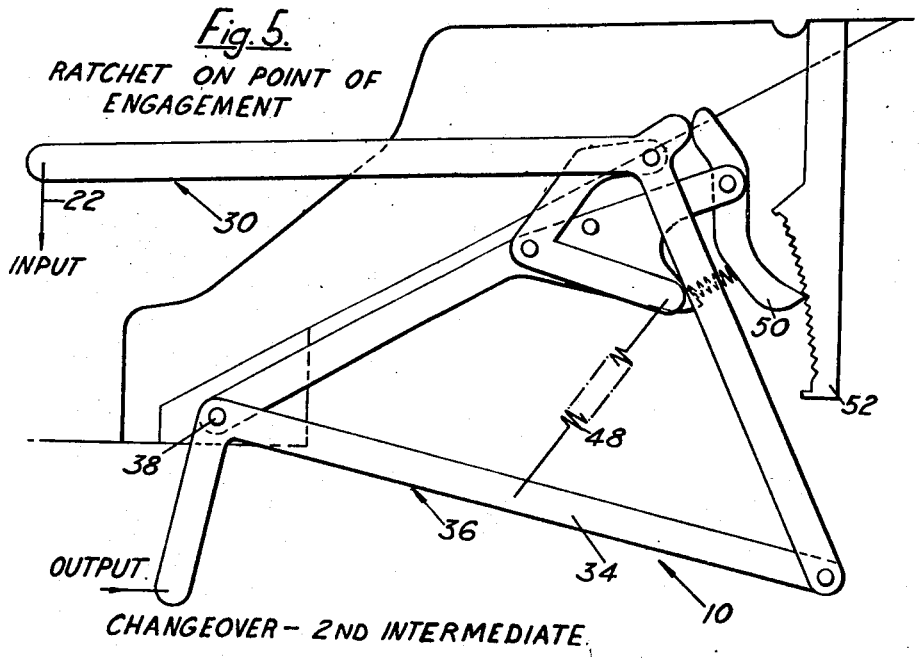
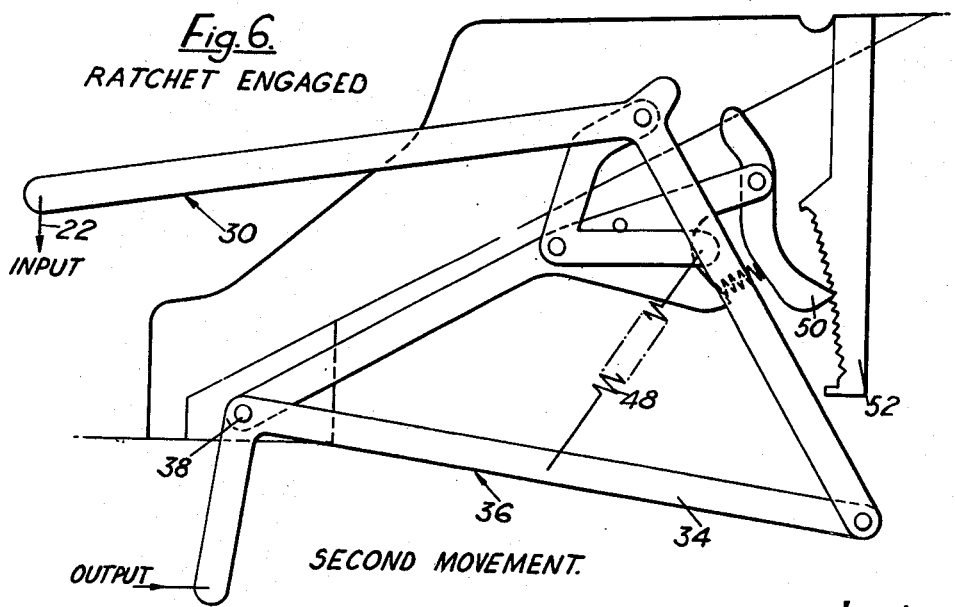

Feb. 17, 1970  M. J. TEDRAKE  3,495,476
VARIABLE-RATIO LEVER MECHANISMS
Filed July 3, 1968  5 Sheets-Sheet 5
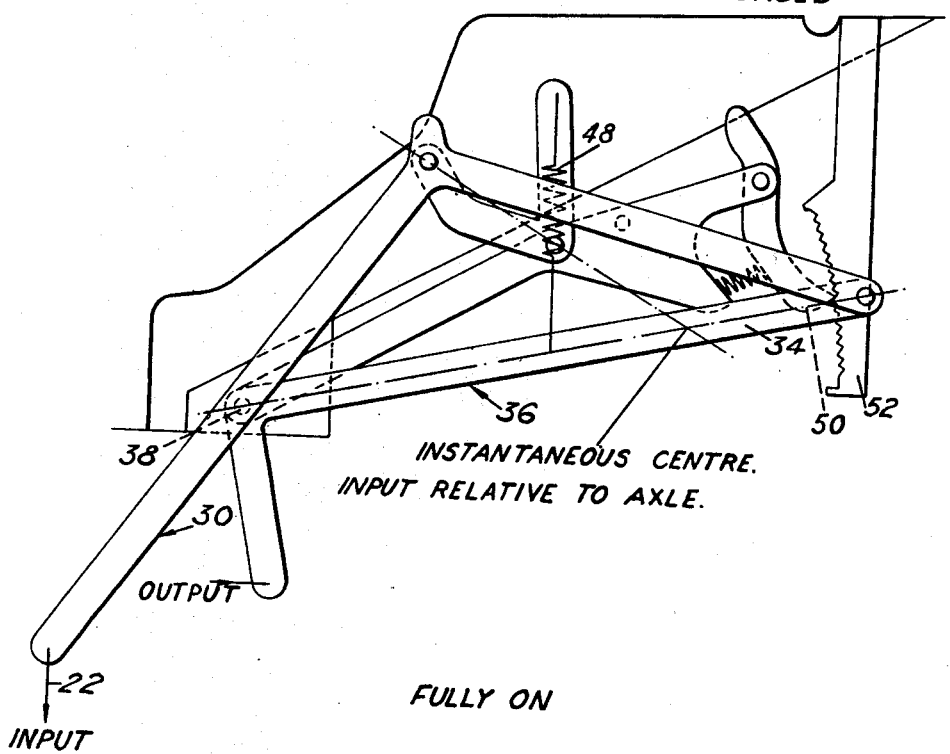
Inventor
Michael John Tedrake
By D. D. McGraw
Attorney

United States Patent Office 3,495,476
Patented Feb. 17, 1970

3,495,476
VARIABLE-RATIO LEVER MECHANISMS
Michael John Tedrake, Portsmouth, England, assignor to General Motors Corporation, Detroit, Mich., a corporation of Delaware
Filed July 3, 1968, Ser. No. 742,428
Claims priority, application Great Britain, July 8, 1967, 31,539/67
Int. Cl. G05g 1/04
U.S. Cl. 74—516
18 Claims

ABSTRACT OF THE DISCLOSURE

The invention is a variable-ratio lever mechanism which is of compact construction such that the mechanism is capable of being mounted on a stationary part of an axle of a vehicle, for example to form part of a motor vehicle handbrake system. The variable-ratio lever mechanism produces in an initial portion of a stroke a large output movement with a low output force, and in a final portion of the stroke a high output force.

---

This invention relates to variable-ratio lever mechanisms which produce in an initial portion of a stroke a large output movement with a low output force, and in a final portion of the stroke a high output force.

Such mechanisms can be used in vehicles, for example in a motor vehicle handbrake system, to give us initial quick take-up of slack in an output linkage, for example a cable or rod system, at a low mechanical advantage, followed by a final increment of movement at a high mechanical advantge: the invention also relates to motor vehicles fitted with such variable-ratio lever mechanisms.

According to the invention, from one aspect, a variable-ratio lever mechanism which is arranged to produce in an initial portion of a stroke a large output movement with a low output force, and in a final portion of the stroke a high output force, is mounted on a stationary part of an axle of a vehicle, and is connected by way of an output linkage to respective brakes for a transverse pair of wheels carried by the axle.

The axle may for instance be a rigid rear axle.

The output linkage is preferably a rod system, conveniently an opposed pair of rods arranged to operate the respective brakes by movement in a direction longitudinally of the respective rods.

The mounting of the mechanism on the axle gives the advantage that the output rods or other output linkage, which carry the greatest load, can be kept short, whereas the input cable or other input linkage need only carry a relatively small load, thereby reducing the amount of stretch and accordingly improving brake efficiency.

According to the invention, from another aspect, in a variable-ratio lever mechanism: a double-arm input lever comprises a first arm forming an input arm and a second arm pivotally connected to an output lever which is mounted on a fixed pivot; the double-arm input lever is pivotally mounted on a control link which is biased towards a rest position relatively to a ratchet lever on which the control lever is pivotally mounted; one end portion of the ratchet lever is mounted on a fixed pivot and the other end portion forms a pivotal mounting for a pawl that is arranged to engage a fixed ratchet only after an initial increment of movement of the input lever; and the arrangement is such that during the initial increment of movement of the input lever the mechanism moves as a whole about the fixed pivot for the output lever, during a further increment of movement of the input lever the pawl engages the fixed ratchet to hold the ratchet lever stationary, and, during a final increment of movement of the input lever, pivotal movement of the input lever takes place about an instantaneous centre which moves progressively towards the pivotal connection between the input and output levers, thereby producing progressively increasing mechanical advantage during the said final increment of movement.

The fixed pivots for the output lever and for the ratchet lever are conveniently formed as a common fixed pivot.

The fixed ratchet is conveniently of concavely arcuate form. The pawl may be spring-biased towards the ratchet by a spring, and be held away from the ratchet by a cam surface whenever the control link is in its rest position relatively to the ratchet lever. The cam surface may for instance be formed on the input lever.

The rest position of the control link relative to the ratchet lever may be determined by a stop, which may for example be mounted on the ratchet lever. The biasing of the control link towards the rest position may for example be effected by a spring, for instance a tension spring connected between the control link and the output lever.

An output linkage may be connected to any point on the output lever, in accordance with the ratio and direction of motion required for the output. The mechanism may for example be mounted, by way of its fixed pivot, on an axle of a motor vehicle, with the output taken by an output linkage in the form of an opposed pair of rods arranged to operate respective brakes for a transverse pair of wheels carried by the axle: with such an arrangement it is convenient for the output to be perpendicular to an input linkage, for example a cable, connected to the input lever for operating the input lever.

The output lever may for instance comprise a double-arm lever of which a first arm extends between the fixed pivot and the pivotal connection between the input and output levers, and a second arm is connected to the output linkage, either directly or by way of a compensator lever. The output lever may be formed as a bell-crank lever, such that the two arms are at an angle to one another.

If a compensator lever is used, it may conveniently be pivotally mounted on the free end portion of the second arm of the output lever, and extend parallel to the second arm. A pair of output connections from the compensator lever to respective brakes for a transverse pair of vehicle wheels may be disposed on opposite sides of the fixed pivot, which may extend through an arcuate slot in the compensator lever, for limiting pivotal movement of the compensator lever by engagement with the ends of the slot.

The input lever may if desired be in the form of a bell-crank lever. Similarly, the control link may if desired be in the form of a bell-crank lever.

The appended claims define the scope of the invention claimed. The invention and how it can be performed are hereinafter particularly described with reference to the accompanying drawings, in which:

FIG. 2 is an enlarged fragmentary view showing details of a slightly modified form of the variable-ratio lever mechanism; and FIGS. 3 to 7 are fragmentary schematic views illustrating the variable-ratio lever mechanism shown in FIG. 2 in five successive positions during a stroke, from an "off" position to a "fully on" position.

Figure 1:
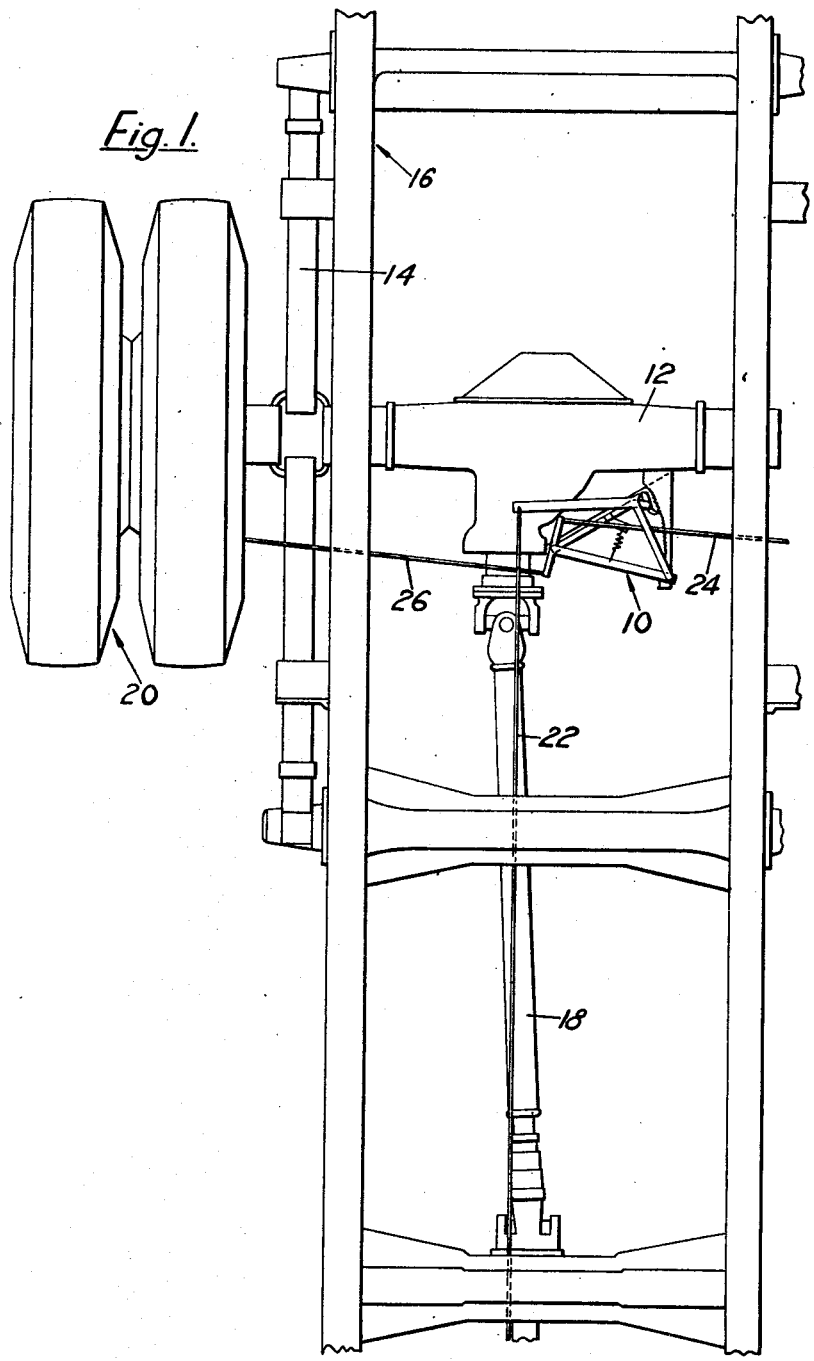
FIG. 1 is a fragmentary plan showing a rigid rear axle of a motor vehicle fitted with one embodiment of a variable-ratio lever mechanism according to the invention for use as a brake booster for cable-operated rear brakes of the vehicle.

As is shown in FIG. 1, a brake booster for cable-operated rear brakes of a motor vehicle comprises a variable-ratio lever mechanism 10 according to the invention mounted on a portion of a rigid rear axle 12 which is resiliently connected by means of a transverse pair of leaf springs 14 to the rear portion of a frame 16 of the vehicle. The rigid rear axle is in this embodiment a live axle, and contains a conventional differential gear mechanism (not shown) for supplying drive from a conventional propeller shaft 18 to driven rear wheels 20 of the vehicle. The brake booster is operable by an input cable 22, and is connected to operate a transverse pair of drum brakes (not shown) for the rear wheels by means of a pair of output cables 24 and 26.

Details of the variable-ratio lever mechanism 10 forming the brake booster are shown in FIG. 2. The input cable 22 is connected to one end of a first arm 28 of a double-arm input lever 30 which is formed as a bell-crank lever and has a second arm 32 the free end of which is pivotally connected to a free end of a first arm 34 of a double-arm output lever 36.

The output lever 36 is also formed as a bell-crank lever, and is mounted on a fixed pivot 38. A second arm 40 of the output lever 36 forms an output arm for operating the rear brakes.

The input lever 30 is pivotally mounted on a control link 42 which is itself pivotally mounted by means of a pivot pin 44 on a ratchet lever 46 one end portion of which is pivotally mounted on the fixed pivot 38. The control link 42 is formed as a bell-crank lever, one arm of which forms a pivotal mounting for the input lever 30 and the other arm of which is connected by means of a resiliently yieldable connection, in the form of a helical tension spring 48, to an intermediate point on the first arm 34 of the output lever 36.

The end portion of the ratchet lever 46 remote from the fixed pivot 38 forms a pivotal mounting for a pawl 50 that is spring-biased towards a fixed ratchet 52, of a concavely arcuate form, by means of a compression spring 54 seated on a shoulder portion 56 of the ratchet lever. The input lever 30 includes a projection 58 in the region of its pivot; a rounded cam surface 60 on this projection can, during an initial increment of movement of the input lever, engage the pawl 50 to oppose the action of the compression spring 54 and hold the pawl out of engagement with the fixed ratchet 52 during this initial increment of movement of the input lever.

There is a stop pin 62 on the ratchet lever, against which the control link 42 is held by the tension spring 48 in an "off" position of the mechanism.

In FIG. 1 the output lever is shown as T-shaped, for operating the output cables 24 and 26 directly. In FIG. 2, however, the output lever 36, of bell-crank lever form, is shown as operating the output cables 24 and 26 by means of a compensator lever 64. The compensator lever is pivotally mounted on the free end portion of the output arm 40 of the output lever, and extends parallel to the output arm. The output cables 24 and 26 are connected to the compensator lever at opposite sides of the fixed pivot 38, which extends through an arcuate slot 66 in the compensator lever, for limiting pivotal movement of the compensator lever by engagement with the ends of the slot.

The operation of the embodiment of the variable-ratio lever mechanism according to the invention which has just been described is illustrated in FIGS. 3 to 7, which represent five successive stages of the brake-engagement stroke of the mechanism. In FIGS. 3 to 7, the compensator lever 64 is omitted for the purpose of simplicity.

Starting from the "off" position shown in FIG. 3, movement of a handbrake control (not shown) in the driver's cab of the vehicle produces a pull on the input cable 22, and, in a first increment of movement of the input lever 30, the entire mechanism 10 moves as a whole about the fixed pivot 38 to the position shown in FIG. 4, to give an initial quick take-up of slack in the output cables, and bring the brake shoes into initial engagement with the brake drum.

During a further increment of movement of the input lever 30, the engagement between the brake shoes and brake drum increases the output load in the cables 24 and 26, so offering a resistance to further movement of the output lever 36. Under such conditions the tension spring 48 begins to yield, and the mechanism passes from the condition shown in FIG. 4, in which the cam surface 60 holds the pawl 50 out of engagement with the fixed ratchet 52, into the condition shown in FIG. 5, in which the pawl 50 is just beginning to engage a tooth of the fixed ratchet 52.

When the pawl 50 engages the fixed ratchet 52, the ratchet lever 46 is held stationary. Thereupon, during a final increment of movement of the input lever 30, pivotal movement of the input lever takes place about an instantaneous centre which, as can be seen by comparison of FIGS. 5, 6 and 7, moves progressively away from the fixed pivot 38 along the arm 34 of the output lever towards the pivotal connection between the input and output levers 30 and 36. In this way, a progressively increasing mechanical advantage is produced during the final increment of movement of the input lever, so producing a very high output force for full engagement of the rear brakes.

To disengage the brakes from the "fully on" condition of the mechanism shown in FIG. 7, the driver releases the handbrake control, whereupon changes take place in the mechanism in the reverse order to the changes described in relation to brake engagement, with movement of the control link 42 being limited by the stop pin 62 as the mechanism once again attains the "off" condition.

I claim:

1. A variable-ratio lever mechanism in which: a double-arm input lever comprises a first arm forming an input arm and a second arm pivotally connected to an output lever which is mounted on a fixed pivot; the double-arm input lever is pivotally mounted on a control link which is biased towards a rest position relatively to a ratchet lever on which the control lever is pivotally mounted; one end portion of the ratchet lever is mounted on a fixed pivot and the other end portion forms a pivotal mounting for a pawl that is arranged to engage a fixed ratchet only after an initial increment of movement of the input lever; and the arrangement is such that during the initial increment of movement of the input lever the mechanism moves as a whole about the fixed pivot for the output lever, during a further increment of movement of the input lever the pawl engages the fixed ratchet to hold the ratchet lever stationary, and, during a final increment of movement of the input lever, pivotal movement of the input lever takes place about an instantaneous centre which moves progressively towards the pivotal connection between the input and output levers, thereby producing a progressively increasing mechanical advantage during the said final increment of movement.

2. A variable-ratio lever mechanism according to claim 1, wherein the fixed pivots for the output lever and for the ratchet lever are formed as a common fixed pivot.

3. A variable-ratio lever mechanism according to claim 1, wherein the fixed ratchet is of concavely arcuate form.

4. A variable-ratio lever mechanism according to claim 3, wherein the pawl is spring-biased towards the ratchet by a spring, and is held away from the ratchet by a cam surface whenever the control link is in its rest position relatively to the ratchet lever.

5. A variable-ratio lever mechanism according to claim 4, wherein the cam surface is formed on the input lever.

6. A variable-ratio lever mechanism according to claim 1, wherein the rest position of the control link relative to the ratchet lever is determined by a stop.

7. A variable-ratio lever mechanism according to claim 6, wherein the stop is mounted on the ratchet lever.

8. A variable-ratio lever mechanism according to claim 1, wherein the control link is biased towards the rest position by a spring.

9. A variable-ratio lever mechanism according to claim 8, wherein the spring biasing the control link comprises a tension spring connected between the control link and the output lever.

10. A variable-ratio lever mechanism according to claim 1, including an output linkage connected to the output lever.

11. A variable-ratio lever mechanism according to claim 10, mounted by way of its fixed pivot on a stationary part of an axle of a motor vehicle, with the output taken by an output linkage in the form of an opposed pair of rods arranged to operate respective brakes for a transverse pair of wheels carried by the axle.

12. A variable-ratio lever mechanism according to claim 11, wherein the output linkage is perpendicular to an input linkage connected to the input lever for operating the input lever.

13. A variable-ratio lever mechanism according to claim 1, wherein the output lever comprises a double-arm lever of which a first arm extends between the fixed pivot and the pivotal connection between the input and output levers, and a second arm is connected to the output linkage.

14. A variable-ratio lever mechanism according to claim 13, wherein the output lever is formed as a bell-crank lever, such that the two arms are at an angle to one another.

15. A variable-ratio lever mechanism according to claim 13, wherein the second arm of the output lever is pivotally connected to the output linkage by way of a compensator lever that is pivotally mounted on the free end portion of the second arm of the output lever, and extends parallel to the second arm.

16. A variable-ratio lever mechanism according to claim 15, wherein a pair of output connections extend from the compensator lever to respective brakes for a transverse pair of vehicle wheels, and are disposed on opposite sides of the fixed pivot for the input lever.

17. A variable-ratio lever mechanism according to claim 15, wherein the fixed pivot for the input lever extends through an arcuate slot in the compensator lever, for limiting pivotal movement of the compensator lever by engagement with the ends of the slot.

18. A variable-ratio lever mechanism according to claim 1, wherein the input lever and the control link are each in the form of bell-crank levers.

References Cited

UNITED STATES PATENTS

| 66,360 | 7/1867 | King | 74—518 |
| 368,347 | 8/1887 | Massey | 74—518 |

FRED C. MATTERN, Jr., Primary Examiner

WESLEY S. RATLIFF, Jr., Assistant Examiner

U.S. Cl. X.R.

74—518